United States Patent [19]

Lebowitz

[11] Patent Number: 4,706,172
[45] Date of Patent: Nov. 10, 1987

[54] ORIENTABLE LAMP

[76] Inventor: Samuel Lebowitz, 278 Clinton Ave., Brooklyn, N.Y. 11205

[21] Appl. No.: 844,625

[22] Filed: Mar. 27, 1986

[51] Int. Cl.$^4$ .............................................. F21V 21/26
[52] U.S. Cl. .................................... 362/270; 362/413; 242/84.8; 174/117 FF
[58] Field of Search ............... 362/413, 270, 258, 387, 362/391, 395, 407, 458, 457, 269, 278, 433, 449, 450; 174/69, 117 F, 117 FF; 242/84.8

[56] References Cited

U.S. PATENT DOCUMENTS

| | | | |
|---|---|---|---|
| 2,543,926 | 3/1951 | Mounique | 362/413 |
| 2,778,017 | 1/1957 | Dorcsjak | 242/84.8 |
| 3,319,061 | 5/1967 | Pohl et al. | 362/270 |
| 3,612,744 | 10/1971 | Thomas | 174/117 FF |
| 3,757,029 | 9/1973 | Marshall | 174/117 FF |
| 4,429,462 | 2/1984 | Rutty et al. | 242/84.8 |
| 4,479,617 | 10/1984 | Edwards | 242/84.8 |
| 4,502,226 | 3/1985 | Hung | 242/84.8 |

Primary Examiner—Raymond A. Nelli
Attorney, Agent, or Firm—Michael Ebert

[57] ABSTRACT

An orientable lamp adjustable both in elevation and angle to properly illuminate an area of interest. The lamp includes a low-voltage, high-intensity light bulb housing attached to the end of an extensible arm cantilevered from a base. The arm is constituted by a pair of superposed electrically-insulated metal tapes that are arched to resist flexure and are interconnected to the bulb terminals to function as a two-wire line. The tapes are windable on a spring-biased reel rotatable within a cylindrical casing mounted on the base and having a projecting nose from which the tapes emerge. The angle of the casing relative to the base is adjustable, whereby the angle of the cantilevered arm may be varied to adjust the angle assumed by the fixture. Also supported on the base is a step-down transformer connected by sliding contacts to the tapes on the rotatable reel to supply low-voltage power to the two-wire line to energize the bulb. By extending or retracting the tapes to lengthen or shorten the arm, one can thereby adjust the elevation of the housing.

6 Claims, 9 Drawing Figures

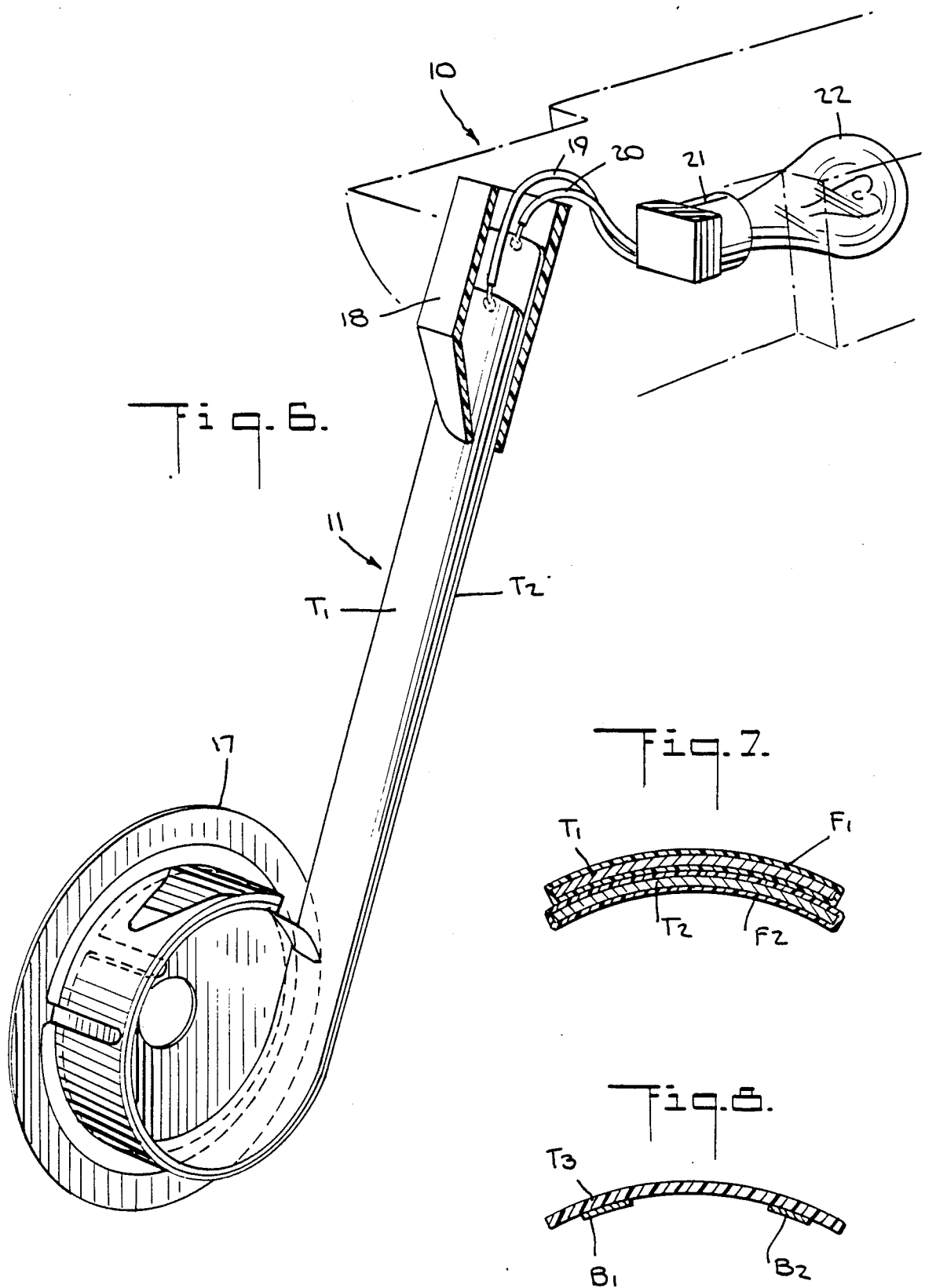

ORIENTABLE LAMP

BACKGROUND OF INVENTION

1. Field of Invention

This invention relates generally to a lamp of the type in which a light bulb housing is supported at the end of an arm extending from a base, and more particularly to a lamp whose arm is extensible, and whose arm angle relative to the base is adjustable, whereby the lamp housing may be oriented, as desired, to illuminate an area of interest.

2. Status of Prior Art

A lamp whose bulb is at a fixed position relative to its base creates an unchanging illumination pattern. In those situations where the need exists to meet changing requirements for illumination, the conventional lamp is unsuited for this purpose.

For example, it is often necessary at a work bench to concentrate light on a given bench area and to then in the course of work shift the light beam onto another area to best view the object being worked on. Depending on the illumination requirements, proper illumination may be obtained by raising or lowering the light bulb housing and by changing the angle of the housing relative to the base. While a high-intensity bulb, such as a halogen bulb, is useful for close work, unless the bulb housing is properly oriented, adequate illumination will not be obtained.

Lamps are known having a light bulb housing whose position on a vertical post is adjustable to change the elevation of the housing relative to the lamp base. Also known are lamps in which the arm or post supporting the lamp housing is formed of telescoping elements, making it possible to adjust the height of the housing. In many lamps of these types, the housing is pivotally mounted on the post so that its angle is adjustable.

Also known are lamps in which the bulb housing is supported on a counterbalanced cantilever arm that is pivoted on a post. In another well-known type of lamp, the housing is supported on an articulated arm formed of interhinged and spring-biased sections, making it possible to adjust the elevation as well as the angle of the housing.

One problem common to all such known forms of lamps is the wiring for the bulb. In those instances where the arm is of fixed length and is hollow, the electrical two-wire line for the bulb may be housed within the arm. But in other cases, the line is external to the articulated arm or whatever other adjustable support means for the housing are provided. This exposed electrical line is unsightly and detracts from the appearance of the lamp. Also, the length of the line must correspond to the maximum length of the adjustable arm; hence when the arm is shortened to lower the bulb position, the line then bows out to create an unsightly loop.

Another drawback of many conventional adjustable lamps is that clamps, set screws and other expedients must be used to maintain the lamp at an adjusted position, and each time a change is made, it then becomes necessary to loosen and then tighten the clamps. In the case of an articulated arm whose sections are pivoted together, these pivots tend to loosen with repeated use and must be tightened to increase their resistance.

Another problem experienced with lamps having an articulated arm formed by sections which assume different angles with respect to each other when the lamp position is adjusted, is that the greater the angles, the more space is required to accommodate the sections. When a lamp of this type is placed in a confined space, it may not then be possible to adjust the lamp as desired.

Of particular prior art interest is the patent to Nicolosi, U.S. Pat. No. 3,369,117, which discloses a high-intensity lamp in which a telescoping element of the adjustable arm acts as a conductor to connect the bulb to a transformer.

SUMMARY OF INVENTION

In view of the foregoing, the main object of this invention is to provide an orientable lamp whose bulb housing is attached to the end of a cantilever arm composed of flexible metal tapes windable on a rotatable reel, whereby the arm may be extended or retracted to change the elevation of the housing.

Also an object of this invention is to provide a lamp of the above type in which the angle of the arm relative to the base is adjustable, whereby the light housing can readily be adjusted both with respect to angle and elevation.

A significant feature of the invention is that the tapes which constitute the extensible arm also function as a two-wire line to supply power to the bulb in the housing. Thus, the orientable lamp, because of its extensible two-wire arm, has a simple and attractive appearance that is free of external wires and other unsightly functional elements. Another significant feature of the invention is that the lamp in its fully retracted state is highly compact; hence, it may be stored or shipped in a small container. Also, when the lamp is put to use on a table, it may be placed in its retracted state in which it is then inconspicuous. And because the arm is an extensible linear tape and is not formed of angled sections, its adjustability is not impaired by a confined space.

Yet another object of the invention is to provide an orientable lamp that is efficient and reliable in operation, and can be mass-produced at relatively low cost. A lamp in accordance with the invention can be realized as a table lamp, a wall-mounted lamp or as a floor lamp.

Briefly stated, in one embodiment of this invention, these objects are attained in an orientable lamp adjustable both in elevation and angle to properly illuminate an area of interest. The lamp includes a low-voltage, high-intensity light bulb in a reflector housing attached to the end of an extensible arm cantilevered from a base. The arm is constituted by a pair of superposed electrically-insulated metal tapes that are arched to resist flexure and are interconnected to the bulb terminals to function as a two-wire line. The tapes are windable on a sping-biased reel rotatable within a cylindrical casing mounted on the base and having a projecting nose from which the tapes emerge.

The angle of the casing relative to the base is adjustable, whereby the angle of the cantilevered arm may be varied to adjust the angle assumed by the housing. Also supported on the base is a step-down transformer connected by sliding contacts to the tapes on the rotable reel to supply low-voltage power to the two-wire line to energize the bulb. By extending or retracting the tapes to lengthen or shorten the arm, one can thereby adjust the elevation of the housing.

BRIEF DESCRIPTION OF DRAWINGS

For a better understanding of the invention as well as other objects and further features thereof, reference is made to the following detailed description to be read in conjunction with the accompanying drawings, wherein:

FIG. 6 is a perspective view of the reel on which the tapes are wound and showing how the tapes are connected to the bulb in the fixture;

FIG. 7 is a transverse section taken through the pair of tapes which together form the extensible arm of the lamp;

FIG. 8 is an alternative form of an extensible arm using a single tape; and

DETAILED DESCRIPTION OF INVENTION

Figure 1:
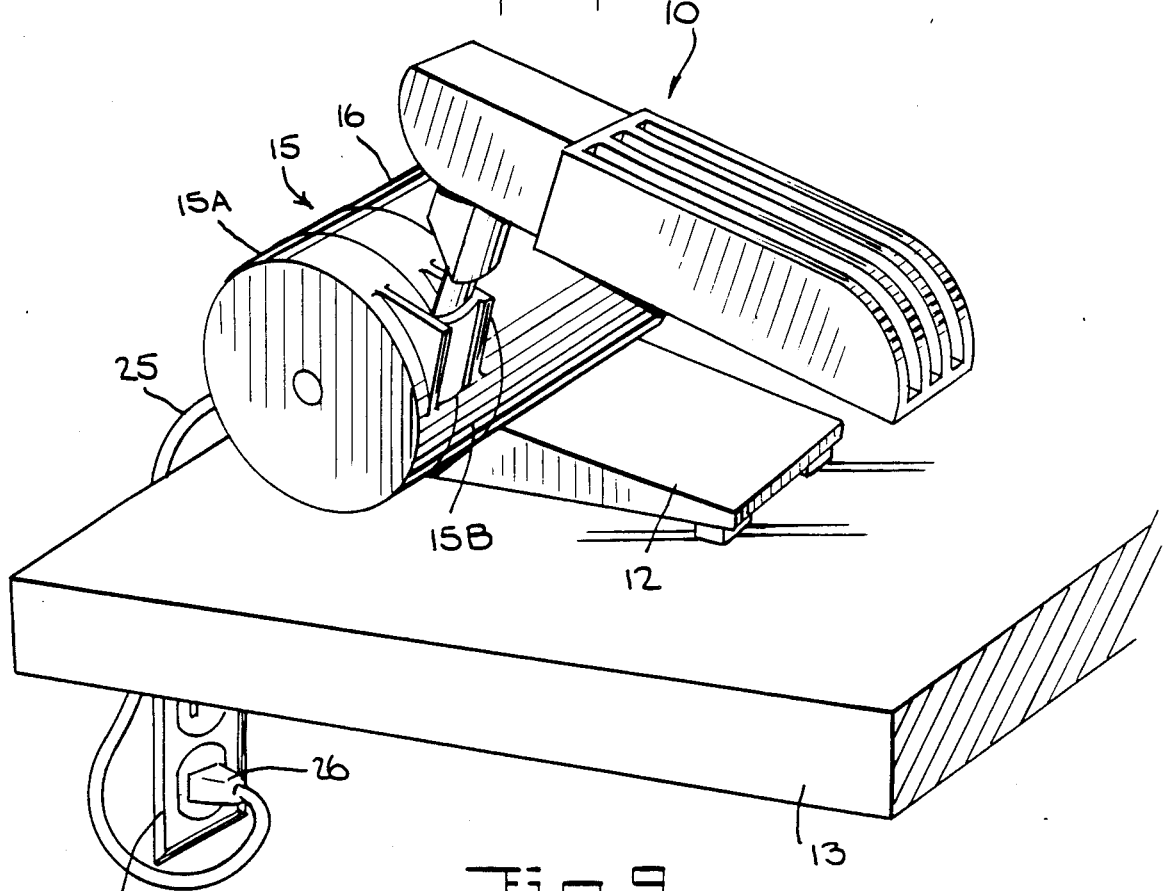
FIG. 1 is a perspective view of one preferred embodiment of an orientable lamp in accordance with the invention, the lamp being shown in its fully retracted, compact state.

First Embodiment:

Referring now to FIG. 1, there is shown an orientable lamp according to the invention in its fully retracted state in which it is highly compact. In this state, the lamp may be stored or shipped in a small box, and therefore need not be dismantled as in the case of lamps which cannot otherwise be reduced in size. The lamp includes a light bulb housing, generally designated by numeral 10, and an extensible arm, generally designated by numeral 11. Arm 11 is cantilevered from a base 12 which is shown resting on a table 13. In practice, base 12 may be in the form of a clamp attachable to a work bench, a desk or other work surface.

The extensible arm 11 is drawn from the projecting nose 14 of a cylindrical casing 15. This casing is formed of two complementary pieces 15A and 15B which are joined together to form a unitary casing that is secured to one end of a cylindrical housing 16 having the same diameter. Housing 16 is anchored on base 12, whereas casing 15 is angularly adjustable relative to the housing to vary the angle of arm 11 relative to the base.

Figure 2:
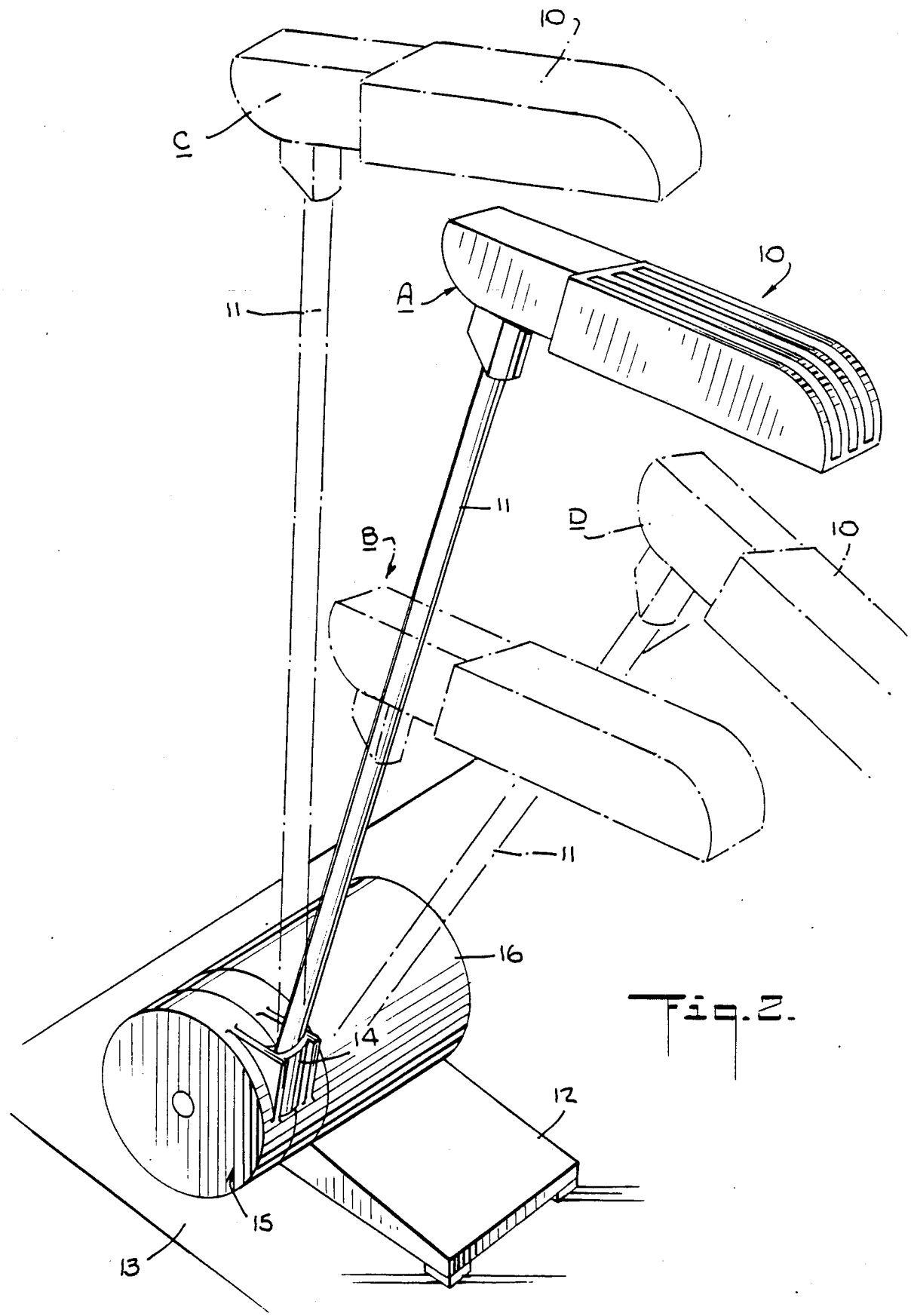
FIG. 2 is a perspective view of the same lamp in an extended state, the extensible cantilever arm being shown in dashed lines at various adjusted angular positions.

Thus, as shown in FIG. 2, arm 11 which is now extended from the casing through the nose 14 of casing 15 may be caused to assume different angular positions, these being indicated in dashed lines. And by more or less extending arm 11, one can thereby change the elevation of housing 10 supported at the end of the arm.

Four distinctly different orientations of arm 11 are illustrated in FIG. 2, these being identified as orientations A, B, C and D. In orientation A, arm 11 makes an angle of about 20 degrees from the vertical and it is extended to raise housing 10, say, about 18 inches above the base. Thus, in orientation A, housing 10 is fairly high and leans somewhat forward. In orientation B, the angle of arm 11 is unchanged, but the arm is shortened so that now housing 10 is only about 10 inches above the base. Hence, the housing angle is unchanged, but the housing is now closer to the base to increase the intensity of illumination on a work piece while at the same time reducing the ambit of illumination. Conversely, the higher the elevation of the housing relative to the base, the greater the ambit of illumination.

In orientation C, arm 11 is now almost vertical and is extended to raise housing 10 about 22 inches above its base. Since, as will later be explained in detail, arm 11 is composed of flexible metal tapes of the type used in a reel-wound measuring tape, the extensibility of arm 11 is much greater than is obtainable with conventional means, such as telescoping elements. In orientation D, arm 11 is at about 40 degrees from the vertical and is extended to raise housing 10 to about 14 inches above the base. It will be appreciated that the four orientations illustrated represent but a small fraction of the possible orientations.

The form of housing 10 is not by any means limited to that shown and may be in any reflector configuration providing a good light source and an attractive appearance.

As shown in FIGS. 6 and 7, extensible arm 11 is constituted by a pair of superposed metal tapes $T_1$ and $T_2$ which are in an arched formation to resist flexure. Tapes $T_1$ and $T_2$ are windable on a rotatable reel 17 housed within the cylindrical casing 16. Even when fully extended, the arched tapes do not flex despite the load imposed thereon by fixture 10.

Tapes $T_1$ and $T_2$ are formed of high-strength flexible metal of good electrical conductivity, such as stainless steel, bronze or other suitable alloys. Each metal tape is ensheathed by a thin coating of electrically-insulating flexible plastic material to form films $F_1$ and $F_2$ thereabout which are firmly bonded to the metal surfaces. These films may be formed by polyester, polyvinyl chloride or other suitable material which is applied to the metal surface by vapor deposition or other known techniques. Because tapes $T_1$ and $T_2$ are superposed, they are electrically insulated from each other by a double layer of insulation.

The leading ends of tapes $T_1$ and $T_2$ are received and held within the hollow handle 18 of fixture 10, and they are connected by leads 19 and 20 to the input terminals of socket 21. This socket is adapted to accommodate a high-intensity bulb 22, such as a tungsten-halogen lamp having a quartz envelope and a halogen (iodine) fill to keep the bulb clean by chemical reaction with sublimated tungsten. This reaction gives rise to high-lumen maintenance throughout the life of the lamp by redepositing evaporated tungsten on the filament rather than on the bulb. In practice, the bulb may be a low voltage miniature fluorescent bulb or any other fluorescent bulb.

Tapes $T_1$ and $T_2$ not only constitute the extensible arm 11 of the lamp but also function as a two-wire line supplying power to the bulb in fixture 10. Because the two-wire line carries a relatively low voltage, even if the insulation on the tapes becomes frayed or is otherwise eroded, so that a user may possibly make direct contact with a metal tape when the lamp is operating, this is not hazardous. One does not receive a shock from a low voltage line any more than one would from an automobile storage battery.

While stainless steel tapes have the desired structural properties for the extensible arm 11, their electrical resistance is somewhat higher than copper. In a low-voltage, high-current line, resistance gives rise to a measurable voltage drop because of the so-called I-R loss. However, while the electrical resistance of stainless steel is higher than that of copper, because use is made of a relatively broad stainless steel tape, its resistance per inch of length is no greater than that of a standard heavy gauge copper wire.

Though the voltage drop produced by the tapes is relatively small, this drop can be taken into account by the choice of voltages. If, therefore, use is made of a 12-volt, 7.5 amp bulb, and the resistance of the two-wire line produces a two-volt drop, then one can use a step-down transformer providing a 14-volt output. In practice, the lamp may be provided with a dimmer. In the case of a halogen light bulb, the bulb when operated at its rated voltage produces an almost white light, which, as the voltage is reduced, assumes a more yellow coloration which, though less intense, is more pleasing to the viewer.

Figure 3:
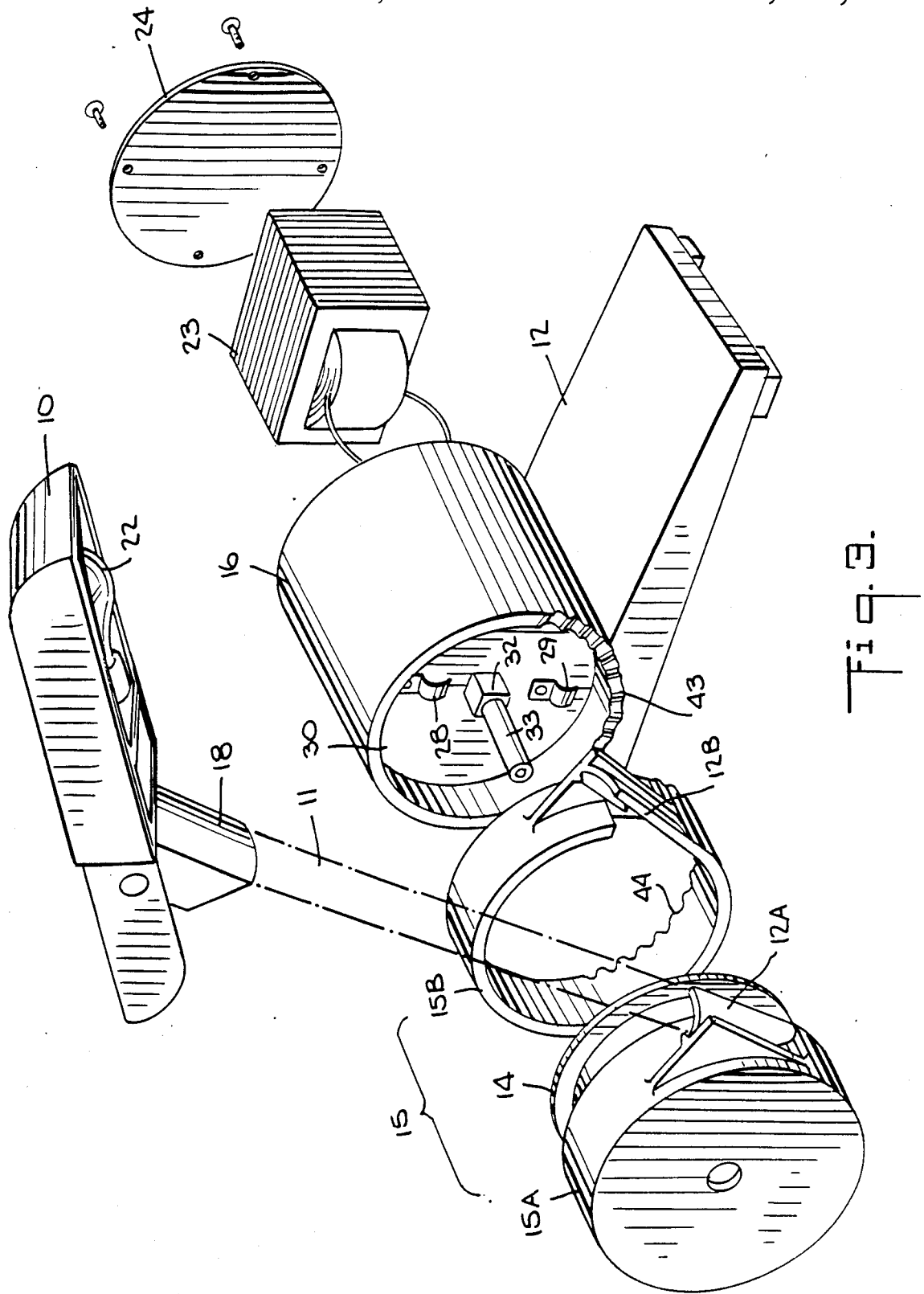
FIG. 3 is an exploded view of the lamp components.
Figure 4:
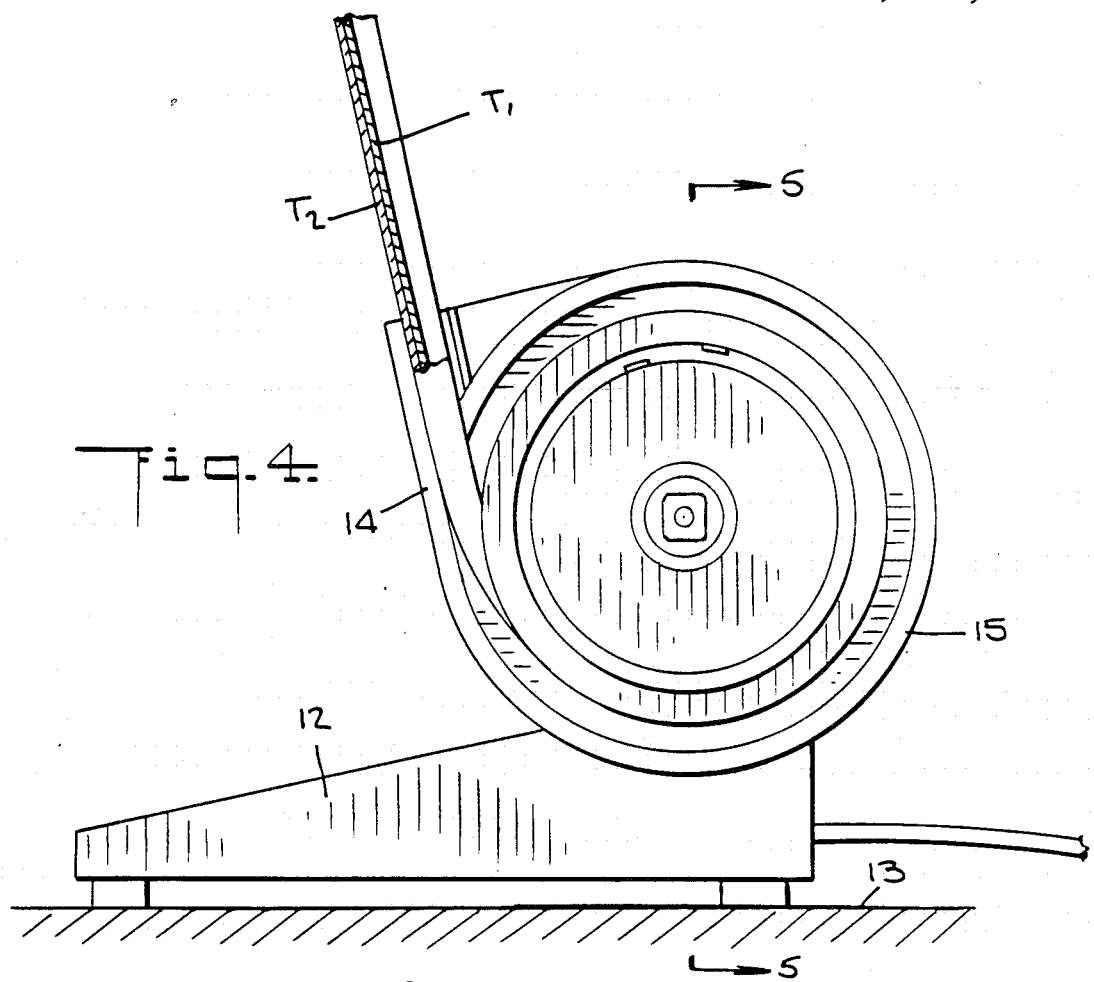
FIG. 4 is an end view of the lamp.
Figure 5:
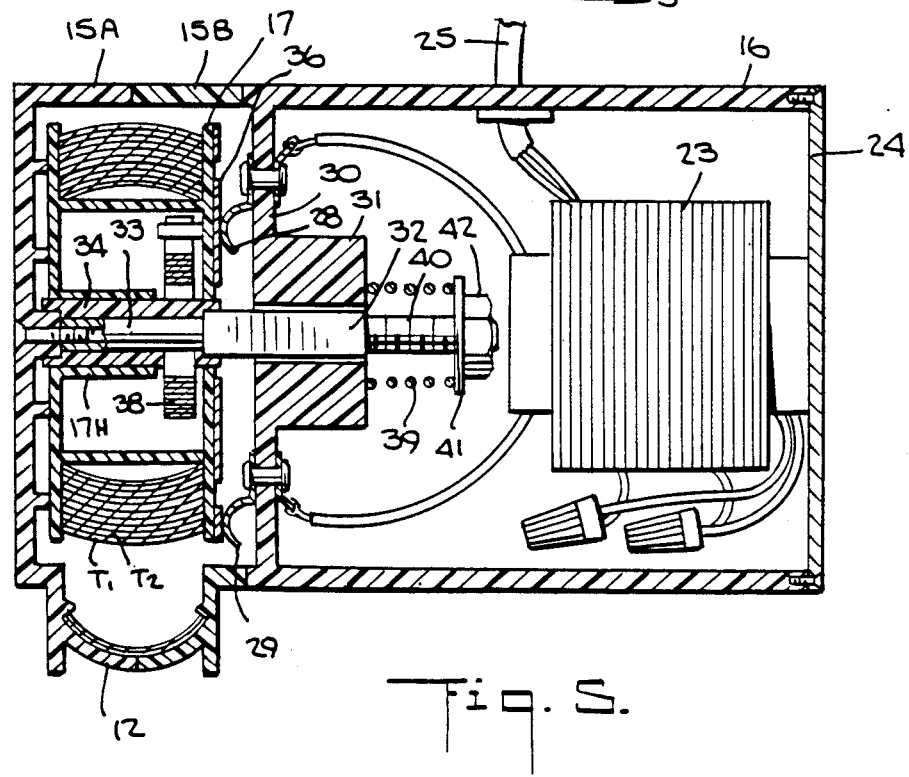
FIG. 5 is a longitudinal section taken in the plane indicated by line 5—5 in FIG. 4.

As shown in FIGS. 3, 4 and 5, cylindrical housing 16 has installed therein a step-down transformer 23, the housing being enclosed at its rear end by a removable cover plate 24. The primary of transformer 23 is connected by a cable 25 through a suitable switch (not shown) to a plug 26 (see FIG. 1). This plug is insertable in the wall socket 27 of a high voltage (i.e., 110 volts a-c) power line.

The secondary of transformer 23 is connected to a pair of spring metal brushes 28 and 29 mounted at diametrically-opposed positions on the outer surface of a front closure disc 30. Disc 30 is centrally provided on its inner surface with an internal hub 31 through which extends the non-rotatable square section of an axle 33. Axle 33 is received within a tubular bearing 34 on which reel 17 is rotatable, the reel having an inner hub 17H which is supported on bearing 34.

Brushes 28 and 29 engage concentric contact rings 36 and 37 mounted on the inner face of reel 17, these rings being connected to the reel ends of tapes $T_1$ and $T_2$ to supply low-voltage power from the transformer to the two-wire line formed by the tapes. A spiral spring 38 surrounding the inner hub 17H of the reel is secured at one end to the reel and at the other end to bearing 34 to spring-bias the reel, so that when arm 11 is retracted, the tapes are then wound on the reel. There is, however, sufficient friction between the angled tapes and projecting nose 12 from which they extend, to prevent the tapes from being returned to the reel unless this action is assisted by pushing down fixture 10 at the end of the tapes.

A helical compression spring 39 surrounds a threaded bolt section 40 extending axially from the square section 32 of the axle and is interposed between the face of hub 31 and a washer 41. This washer is held on bolt section 40 by a nut 42 which can be turned in either direction on the threaded bolt to vary the spring pressure. The spring-biased axle functions to urge casing 15 against housing 16.

As shown in FIG. 3, cylindrical housing 16 is provided at its circular leading edge with an arcuate series of cam teeth 43, while the adjoining casing section 15B is provided at its circular edge with a complementary arcuate series of cam teeth 44. Because casing 15 is held by a spring-force against housing 16, the user may pull out casing 15 and rotate it relative to housing 16 to a desired angular position. This rotation causes the cam teeth of section 44 of the casing to ride over the teeth of section 43 of the housing. These teeth interengage at the selected angular position of the casing to retain its angular setting.

Thus, the lamp may be adjusted so that its fixture 10 occupies a desired orientation by more or less extending the cantilever arm 11 and by varying the angle assumed by the arm relative to the base.

While in the first embodiment of the invention as illustrated in FIGS. 1 to 7, the cantilevered arm is formed by a pair of superposed metal tapes which are ensheathed in electrical insulation, in an alternate form of the arm, as shown in FIG. 8, a single tape $T_3$ may be used formed of high strength flexible plastic material such as acetyl resin in an arched formation. In this instance, a pair of parallel electrically conductive bands $B_l$ and $B_2$ are metallized on the inner surface of the plastic tape to form a two-wire line for conducting power to the bulb. These metallized bands may be formed by printed circuit techniques. Or the plastic tape may have parallel channels molded therein to receive flexible conductive strips.

Still another alternative arrangement is to provide a pair of superposed synthetic plastic tapes, each having thereon a metallized band forming one conductor of the two-wire line.

Figure 9:
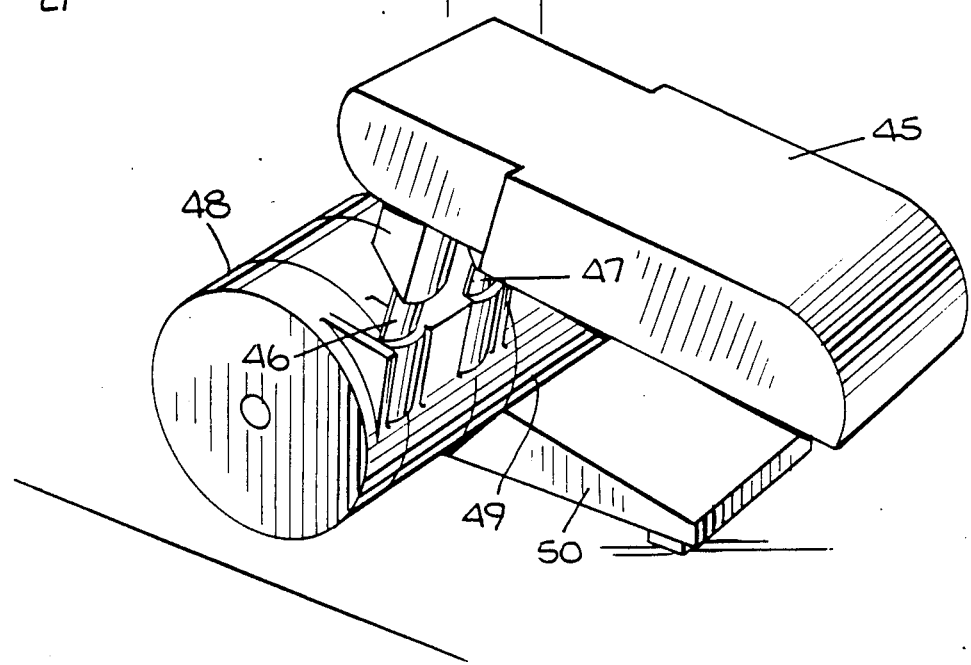
FIG. 9 is a perspective view of another embodiment of the invention in the retracted state.

Second Embodiment:

Referring now to FIG. 9, there is shown a second embodiment of a lamp in accordance with the invention in its fully retracted state.

In this embodiment, a bulb housing 45 is supported by a cantilever arm composed of parallel metal tapes 46 and 47, each of which is ensheathed in an electrically-insulating film, the tapes having an arched formation.

The tapes are extendable from a dual reel rotatable in a cylndrical casing 48 which is angularly adjustable relative to a cylindrical housing 49 anchored on a base 50. Thus, as in the first embodiment, the tapes function both as the cantilever arm and as a two-wire line to convey power to the bulb from a step-down transformer installed in housing 49. The advantage of parallel tapes is that the resultant arm is more resistant to torque forces.

This invention is not limited to halogen type bulbs, for in practice other forms of incandescent bulbs may be used. Also, one may use a fluorescent type bulb. But since the voltage available from the tapes is low (i.e., 12 v. AC), in that instance it is necessary to include in the housing for the bulb a printed circuit or integrated circuit chip to convert the low input voltage thereto to an output voltage capable of exciting the fluorescent bulb.

An extensible lamp in accordance with the invention also lends itself to mounting as a ceiling fixture in an arrangement in which the bulb housing can be more or less pulled down from the ceiling.

While there has been shown and described a preferred embodiment of an orientable lamp in accordance with the invention, it will be appreciated that many changes and modifications may be made therein without, however, departing from the essential spirit thereof.

I claim:

1. An adjustable lamp comprising:
   A. a light housing provided with a bulb-receiving socket having input terminals and a bulb in said socket;
   B. an extensible arm cantilevered from a base to support said housing, said arm being constituted by parallel electrically-insulated flexible metal tapes that are connected to the socket terminals to form a two-wire line leading to the bulb, each tape being ensheathed by a thin film of flexible plastic material bonded to the metal surface thereof, said tapes being wound on a common rotatable reel mounted for rotation in a casing which is angularly adjustable relative to the base to change the angle of the arm and hence that of the bulb housing, whereby said arm may be lengthened or shortened to change the elevation of the housing relative to the base, said tapes being arched to resist flexure and being in superposed relation to form a structural beam to support the housing so that the superposed arched tapes do not flex even when fully extended despite the load imposed thereon by the housing; and C. means to supply power to the tapes in the reel to energize the bulb through the two-wire line.

2. A lamp as set forth in claim 1, wherein said power supply means includes concentric rings mounted on one face of the reel and connected to the tapes, and brushes engaging said rings connected to a power source.

3. A lamp as set forth in claim 1, wherein said reel is mounted for rotation within a cylindrical casing provided with a projecting nose from which the tapes emerge.

4. A lamp as set forth in claim 1, wherein said bulb is a high-intensity, low-voltage bulb, and said casing is secured to one end of a cylindrical power housing of the same diameter anchored on the base, said casing being angularly adjustable, relative to the power housing, said power housing having a step-down transformer therein to supply a low voltage to the tapes in the reel.

5. A lamp as set forth in claim 4, wherein said bulb is a halogen bulb.

6. A lamp as set forth in claim 4, wherein said casing and said power housing are provided at their adjoining edges with a complementary arcuate series of cam teeth, and said casing is spring-biased against the power housing whereby an angular adjustment of the casing relative to the power housing is against the action of the spring and is maintained by the inter engagement of the casing and housing teeth.

* * * * *